(12) United States Patent
Zufall

(10) Patent No.: US 7,206,595 B2
(45) Date of Patent: Apr. 17, 2007

(54) SYSTEM AND METHOD OF PROVIDING GROUP DISPATCH CALLING BETWEEN USERS IN DISTINCT GEOGRAPHICAL AREAS

(75) Inventor: David Zufall, Reston, VA (US)

(73) Assignee: Nextel Communications, Inc., Overland Park, KS (US)

(*) Notice: Subject to any disclaimer, the term of this patent is extended or adjusted under 35 U.S.C. 154(b) by 229 days.

(21) Appl. No.: 10/889,092

(22) Filed: Jul. 12, 2004

(65) Prior Publication Data
US 2006/0019690 A1  Jan. 26, 2006

(51) Int. Cl.
H04Q 7/20 (2006.01)
H04M 3/42 (2006.01)
H04L 12/28 (2006.01)

(52) U.S. Cl. .................. 455/519; 455/416; 455/518; 370/390

(58) Field of Classification Search ................ 455/507, 455/518, 433, 508, 519, 54.2, 517, 416; 370/390, 370/312, 432
See application file for complete search history.

(56) References Cited

U.S. PATENT DOCUMENTS 5,689,810 A * 11/1997 Shaughnessy et al. ...... 455/517
6,640,109 B1 * 10/2003 Drozt et al. ................. 455/508
2003/0236093 A1   12/2003 Drotz et al.
2004/0002351 A1 *  1/2004 Upp et al. .................. 455/519
2006/0052126 A1 *  3/2006 Choksi ....................... 455/518

OTHER PUBLICATIONS

International Search Report for PCT/US05/24596 dated Aug. 28, 2006.
Written Opinion of the International Searching Authority for PCT/US05/24596 dated Aug. 28, 2006.

* cited by examiner

*Primary Examiner*—Tilahun Gesesse

(57) ABSTRACT

A dispatch communications system is disclosed that facilitates group dispatch communications respectively between subscriber units residing within a first geographical area, subscriber units residing within a second geographical area, and subscriber units residing respectively within the first and second geographical areas. The dispatch communications system includes a first intra-area dispatch communications network to facilitate group dispatch calling between subscriber units residing within a first geographical area; a second intra-area dispatch communications network to facilitate group dispatch calling between subscriber units residing within a second geographical area different than the first geographical area; and an inter-area dispatch communications network to facilitate group dispatch calling between subscriber units residing respectively within the first and second geographical areas. A call processing unit controls both inter-area and intra-area group dispatch calls for the dispatch communications system.

42 Claims, 11 Drawing Sheets

SYSTEM AND METHOD OF PROVIDING GROUP DISPATCH CALLING BETWEEN USERS IN DISTINCT GEOGRAPHICAL AREAS

FIELD OF THE INVENTION

This invention relates generally to communications systems, and in particular, to a system and method of providing group dispatch calling between users in distinct geographical areas.

BACKGROUND OF THE INVENTION

Group dispatch calling between users is becoming increasingly popular. One of the main reasons for its popularity is that the setup time for a group dispatch call is relatively small as compared to, for example, the setup time for a group cellular telephone call (i.e., a conference call). Another distinction between a dispatch communication and a cellular telephone communication is that a dispatch communication is typically half-duplex. That is, a dispatch communication link is allocated to a single user at a time for transmitting voice and/or data.

In the past, group dispatch calling (a dispatch call between a calling party and two or more target parties) was limited to users situated within a limited geographical area, such as, for example, Chicago. The reason is that the dispatch communications network processing group dispatch calls had limited coverage within such geographical area. Thus, if a user roamed beyond the geographical area covered by the corresponding dispatch communications network, for example, to Los Angeles, the user would not be able to make group dispatch calls.

Accordingly, there is a need for a system and method of providing group dispatch calling between users in distinct geographical areas covered respectively by distinct intra-area dispatch communications networks.

SUMMARY OF THE INVENTION

An aspect of the invention relates to a dispatch communications system that facilitates group dispatch communications between subscriber units residing within a first geographical area, subscriber units residing within a second geographical area, and subscriber units residing respectively within the first and second geographical areas. The dispatch communications system includes a first intra-area dispatch communications network to facilitate group dispatch calling between subscriber units residing within a first geographical area; a second intra-area dispatch communications network to facilitate group dispatch calling between subscriber units residing within a second geographical area different than the first geographical area; and an inter-area dispatch communications network to facilitate group dispatch calling between subscriber units residing respectively within the first and second geographical areas.

Another aspect of the invention relates to a call processing unit, such as a visitor location registration dispatch (VLR-D) device, to process inter-area and intra-area group dispatch calls for the dispatch communications system. In this regard, the call processing unit receives a group dispatch call request from a calling subscriber unit requesting a dispatch call to two or more target subscriber units, and establishes a communications link across the intra-area communications network if at least one of the target subscriber units is located within the same geographical area as the calling subscriber unit, and/or across the inter-area communications network if at least one of the target subscriber units is located a different geographical area as that of the calling subscriber unit.

Another aspect of the invention relates to an exemplary call processing methodology implemented by the call processing unit. According to the call processing methodology, the call processing unit receives a group dispatch call request from a calling subscriber unit targeting a plurality of target subscriber units. The call processing unit then determines whether at least one of the target subscriber unit is assigned thereto, and if so accesses the current routing information pertaining to such target subscriber unit(s). Using the current routing information pertaining to such target subscriber unit(s), the call processing unit pages the target subscriber unit. If the call processing unit receives a response to the page, it establishes a dispatch communications link across the intra-area communications network to allow the calling subscriber unit to communicate with such target subscriber unit(s). If the call processing unit does not receive a response to the page, it sends a message to the calling subscriber unit indicating that such target subscriber unit(s) is not available.

If the call processing unit determines that it is not assigned to handle dispatch calls for at least one of the target subscriber units, the call processing unit sends a request to a home location registration dispatch (HLR-D) device for information regarding the call processing unit assigned to handle calls for the target subscriber unit(s). Once the call processing unit obtains that information, it sends a request to the target call processing unit(s) for the routing information pertaining to the target subscriber unit(s). Having this information, the call processing unit pages the target subscriber unit(s). If the call processing unit receives any response to the page(s), it establishes a dispatch communications link across the inter-area communications network to allow the calling subscriber unit to communicate with such target subscriber unit(s). If the call processing unit does not receive a response to the page(s), it sends a message to the calling subscriber unit indicating that such target subscriber unit(s) is not available.

Other aspects of the dispatch communications system include an HLR-D device containing information related to subscribers, fleets, talk groups, and current registrations; interfaces, such as dispatch site controllers (DSCs), for respectively coupling the intra-area communication networks with the inter-area communications network; packet duplicators for generating voice packets for transmission across the inter-area and/or intra-area communications networks; and cell cites including access controller gateways (ACGs) and enhanced base transceiver stations (EBTSs).

Other aspects, features, and techniques of the invention will be apparent to one skilled in the relevant art in view of the following detailed description of the invention.

BRIEF DESCRIPTION OF THE DRAWINGS

FIGS. 3-1 and 3-2 illustrate a flow diagram of an exemplary method of processing a group dispatch call performed by the exemplary dispatch communications system in accordance with another embodiment of the invention;

DETAILED DESCRIPTION OF THE INVENTION

Figure 1:
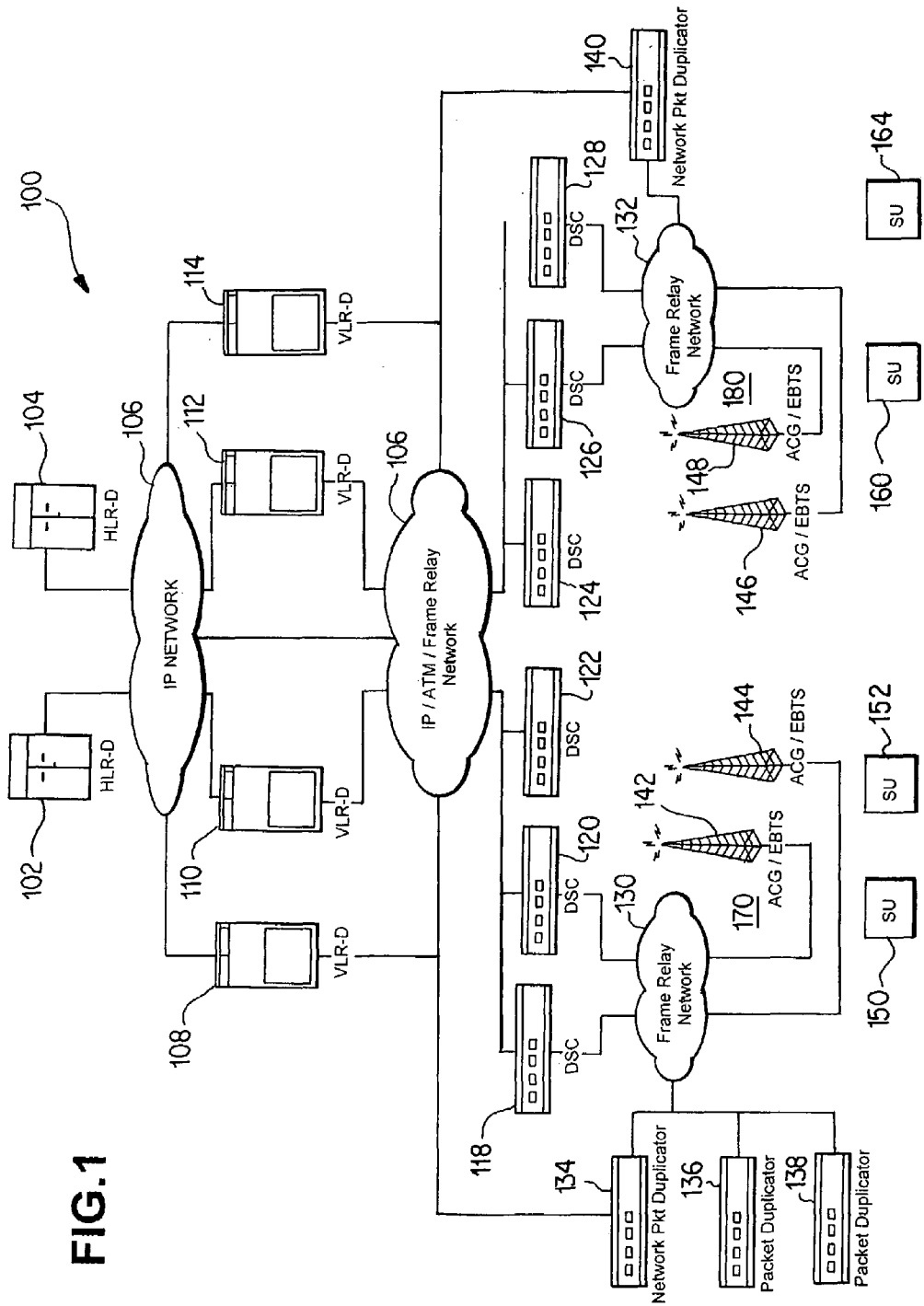
FIG. 1 illustrates a block diagram of an exemplary dispatch communications system in accordance with an embodiment of the invention.

FIG. 1 illustrates a block diagram of an exemplary dispatch communications system 100 in accordance with an embodiment of the invention. The dispatch communications system 100 includes one or more home location registration dispatch (HLR-D) devices 102 and 104, an inter-area communications network 106, a plurality of visitor home location registration dispatch (VLR-D) devices 108, 110, 112, and 114, a plurality of dispatch site controllers (DSCs) 118, 120, 122, 124, 126, and 128, a plurality of intra-area communications networks 130 and 132, a plurality of intra-area packet duplicators 136 and 138, a plurality of inter-area (network) packet duplicators 134 and 140, a plurality of access controller gateways (ACGs)/enhanced base transceiver stations (EBTSs) 142, 144, 146 and 148, and a plurality of subscriber units (SUs) 150, 152, 160 and 162, which can be mobile stations (MSs), for example.

As is discussed in more detail below, the HLR-D devices 102 and 104 send information to requesting elements of the dispatch communications system 100, assist in the registration of SUs, and assist in the processing of group dispatch calls. Each HLR-D includes a database containing provisioning information for subscribers, fleets, talk-groups, and various elements of the dispatch communications system 100.

As is discussed in more detail below, the VLR-D devices 108, 110, 112, and 114 act as call processing units to process group dispatch calls, assist in the processing of group dispatch calls, and assist in tracking the movement of SUs between different dispatch location areas (DLAs). Each VLR-D device includes a database containing information related to a portion of the active subscribers of the dispatch communications system 100, and information related to group dispatch calls.

The inter-area communications network 106 facilitates voice and data communications between various elements of the dispatch communications system 100, including the HLR-D devices 102 and 104, the VLR-D devices 108, 110, 112, and 114, the DSCs 118, 120, 122, 124, 126, and 128, and the inter-area (network) packet duplicators 134 and 140. The inter-area communications network 106 may be partitioned into multiple distinct networks, such as a network to assist in data communications between HLR-D and VLR-D devices, and another network to assist in voice and data communications between the VLR-D devices, DSCs, and inter-area packet duplicators. The inter-area communications network 106 may be of any suitable types, including internet protocol (IP), asynchronous transfer mode (ATM), and frame relay.

The DSCs 118, 120, and 122 provide an interface between the intra-area communications network 130 and the inter-area communications network 106. In performing its interface function, the DSCs convert data communications between the protocol used in the intra-area network 130 and the protocol used in the inter-area network 106. In addition, the DSCs provide an address mapping of the devices of the intra-area communications network 130 to the VLR-Ds, and vice-versa. In this manner, a VLR-D is able to communicate with cell sites and other devices of the intra-area communications network 130, and vice-versa. For example, a VLR-D will track the dispatch location area (DLA) of a subscriber, and then tell the corresponding DSC which DLA to use in paging the subscriber. The DLA will then map the paging message from the VLR-D to the DLA. In addition, the DSCs 118, 120, and 122 also identify appropriate links (e.g. a data link call identifier (DLCI)—Frame Relay type network) or address (IP or ATM type network) information for group dispatch calls spanning the intra-area network 130.

Similarly, the DSCs 124, 126, and 128 provide an interface between the intra-area communications network 132 and the inter-area communications network 106. In performing its interface function, the DSCs convert data communications between the protocol used in the intra-area network 132 and the protocol used in the inter-area network 106. In addition, the DSCs provide an address mapping of the devices of the intra-area communications network 132 to the VLR-Ds, and vice-versa. In this manner, a VLR-D is able to communicate with cell sites and other devices of the intra-area communications network 132, and vice-versa. In addition, the DSCs 124, 126, and 128 also identify appropriate data link call identifiers (DLCIs) for group dispatch calls spanning a Frame-Relay type intra-area network 132.

The intra-area communications network 130 facilitates voice and data communications between the various elements serving a first distinct geographical area 170 (e.g., Chicago), including the DSCs 118, 120, and 122, the ACGs/EBTSs 142 and 144, and the packet duplicators 134, 136, and 138. Similarly, the intra-area communications network 132 facilitates voice and data communications between the various elements serving a second distinct geographical area 180 (e.g. Los Angeles), including the DSCs 124, 126, and 128, the ACGs/EBTSs 146 and 148, and the packet duplicator 140. The intra-area networks 130 and 132 may be of any suitable types, such as a Frame Relay. The geographic coverage or number of ACGs/EBTSs within a distinct geographical area such as 170 or 180 may be arbitrarily small and need contain no more than one ACG/EBTS and one DSC. The geographic coverage or number of ACGs/ EBTSs may be as large as is practical given the physical constraints of the DSC and intra-area Frame Relay Network (130,132).

The packet duplicators 134, 136, and 138 generate voice packets for SUs located within the first geographical area 170. Some of the packet duplicators, such as 136 and 138, may operate to generate and send voice packets only across the intra-area network 130. This may be the case where two or more SUs are both situated within geographical area 170. The other packet duplicator 134 may operate to generate and send voice packets across the inter-area network 106. This may be the case where two or more SUs are respectively situated in distinct geographical areas 170 and 180. Similarly, packet duplicator 140 may operate to generate and send voice packets for transmission by SUs located within the second geographical area 180. The packet duplicator 140 may generate voice packets compliant for transmission across both the intra-area network 132 and the inter-area network 106.

The ACGs/EBTSs 142 and 144 are the represented cell sites that service subscribers, such as SUs 150 and 152, within the geographical area 170. Similarly, ACGs/EBTSs 146 and 148 are the represented cell sites that service subscribers, such as SUs 160 and 162, within the geographical area 180. The ACGs/EBTSs provide the wireless radio frequency (RF) interface and communications control between the SU's and the corresponding intra-area networks.

As the functionality of the various elements of the dispatch communications system 100 has been discussed, the following provides a discussion of an exemplary method of registering an SU, an exemplary method of processing a group dispatch call between three or more SUs, and an exemplary method of tracking the movement of an SU between distinct DLAs.

Figure 2:
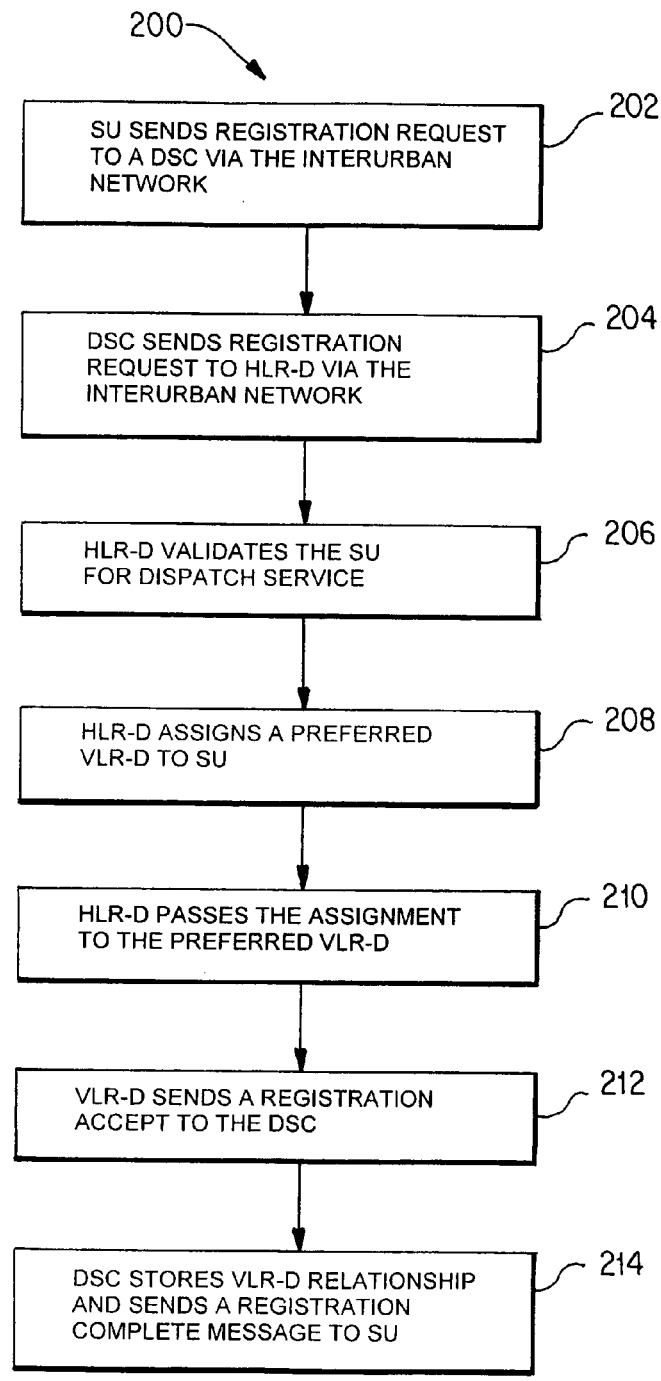
FIG. 2 illustrates a flow diagram of an exemplary method of registering a subscriber unit (SU) with the exemplary dispatch communications system in accordance with another embodiment of the invention.

FIG. 2 illustrates a flow diagram of an exemplary method 200 of registering a subscriber unit (SU) with the exemplary dispatch communications system 100 in accordance with another embodiment of the invention. In this example, SU 150 is making a request to register with the dispatch communications system 100 to obtain dispatch call services. With further reference to FIG. 1, the registration method 200 begins by an SU 150 sending a registration request to the DSC 120 by way of the ACG/EBTS 142 and the intra-area network 130 (block 202). The registration request may include information related to the subscriber, such as its international mobile station identifier (IMSI) or its international mobile equipment identifier (IMEI). The DSC 120, in turn, sends the registration request to the HLR-D device 102 by way of the inter-area network 106 (block 204).

After receiving the registration request, the HLR-D device 102 searches its database to determine whether the requesting SU 150 is provisioned (i.e., valid) for receiving dispatch call services (block 206). This may entail the HLR-D device 102 searching its accounts/receivable information related to the subscriber to determine whether the subscriber has paid for dispatch services. If the HLR-D device validates the requesting SU 150, the HLR-D device 102 assigns a preferred VLR-D device (e.g., VLR-D device 110) to handle dispatch calls for the requesting SU 150 (block 208). The assignment of the VLR-D device 110 may be based on the current registration of other members of the requesting subscriber's fleet and/or talk-group. In other words, it is preferable that members of a fleet and/or talk group be assigned to the same VLR-D device for call processing efficiency.

After assigning a preferred VLR-D device 110 to the requesting SU 150, the HLR-D device 102 sends the assignment to the VLR-D device 110 by way of the inter-area network 106 (block 210). The VLR-D device 110 stores routing information pertaining to the requesting SU 150, such as the DSC and DLA used for communicating with the SU 150. After receiving and processing the assignment of the requesting SU 150, the VLR-D device 110 sends a registration acceptance message to the corresponding DSC 120 by way of the inter-area network 106 (block 212). The DSC 120, in turn, stores the VLR-D relationship for the SU 150 and sends a registration acceptance message to the SU 150 by way of the intra-area network 130 and corresponding ACG/EBTS 142 (block 214). Once the registration process is complete, the SU 150 is now provisioned with the dispatch communications system 100 to make group dispatch calls to other SUs.

Figures 1, 3:
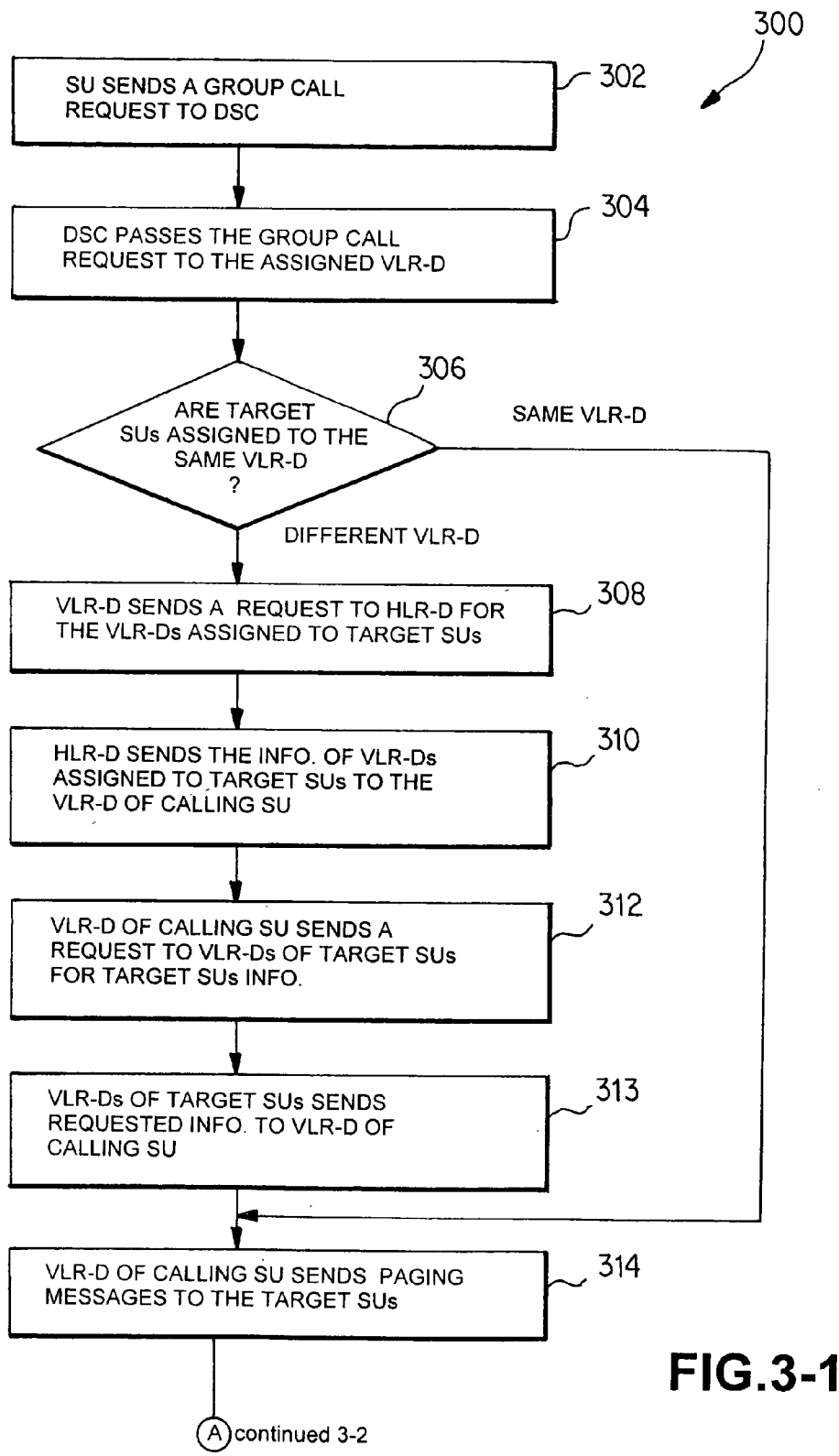
Figures 2, 3:
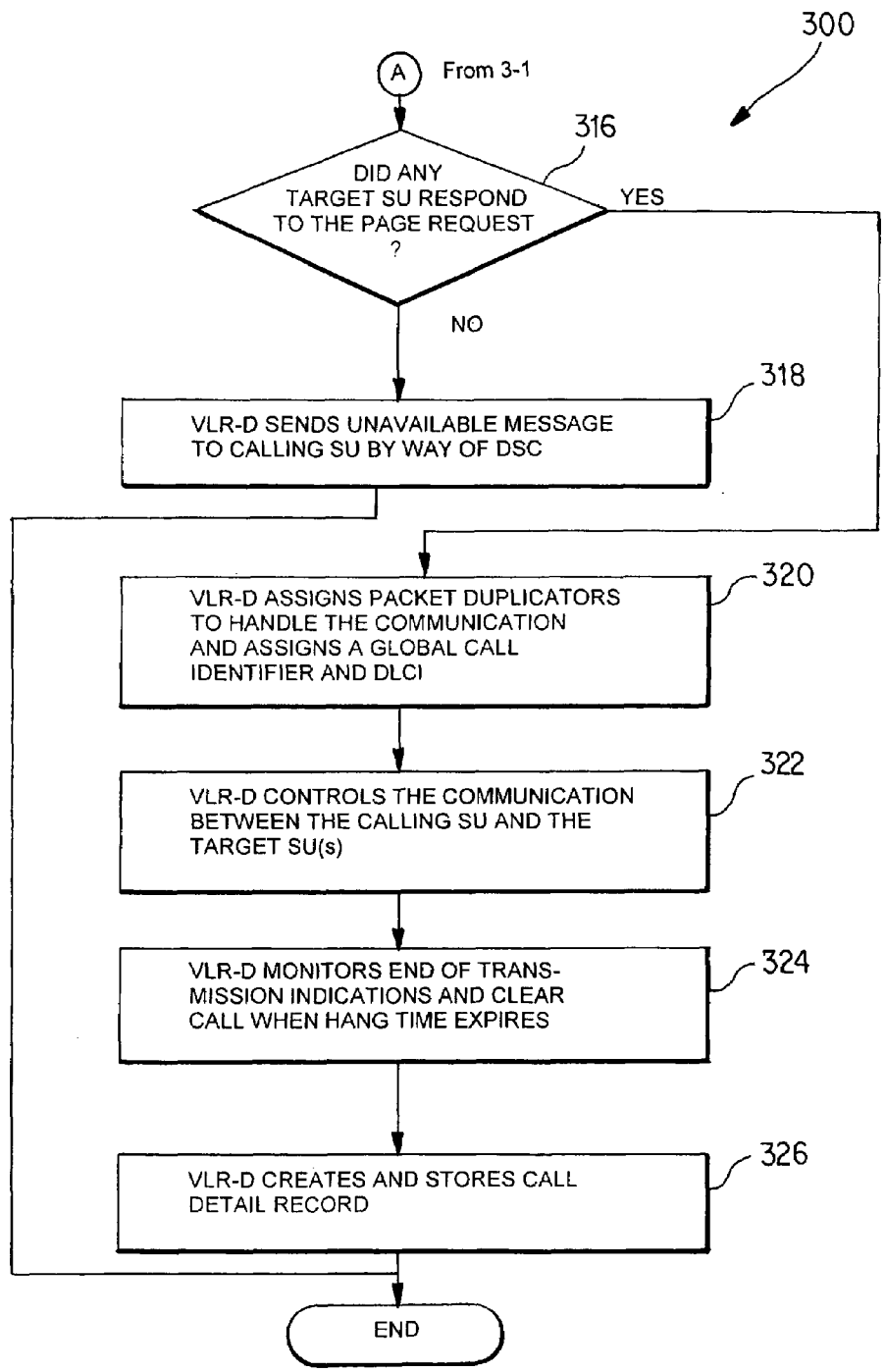

FIGS. 3-1 and 3-2 illustrate a flow diagram of an exemplary method 300 of processing a group dispatch call by the exemplary dispatch communications system 100 in accordance with another embodiment of the invention. In this example, SU 150 is making a group dispatch call to SU 152 (e.g., another member of the same fleet and located in geographical area 170) and SUs 160 and 162 (e.g., subscribers located in geographical area 180). With further reference to FIG. 1, the group call processing method 300 begins with SU 150 sending a group call request message to the DSC 120 by way of the corresponding ACG/EBTS 142 and the intra-area network 130 (block 302). The group call request message includes the IMSI of SU 150 (i.e., the calling SU) and a talk-group identifier to identify a talk-group comprised of SUs 152, 160, and 162 (i.e., the target SUs). The DSC 120 then sends the group call request message to the VLR-D device 110 assigned to the SU 150 (block 304).

After the VLR-D 110 receives the group call request message, it searches its database to determine whether it is assigned to handle dispatch calls for the talk-group's target SUs (block 306). In such case, the VLR-D device 110 would have the routing information pertaining to the target SU. If it does, as in the case of SU 152, then the method proceeds to block 314. In the case of target SUs not assigned to VLR-D device 110, such as SUs 160 and 162, the VLR-D device 110 sends a message to the HLR-D device 102 by way of the inter-area network 106 requesting the information of the VLR-D device(s) assigned to the target SUs 160 and 162 (block 308). The HLR-D device 102 responds by performing a database search and then sending the requested VLR-D device information to the VLR-D 110 by way of the inter-area network 106 (block 310). In this example, VLR-D device 112 is assigned to the target SU 160 and VLR-D device 114 is assigned to SU 162.

Once the VLR-D device 110 has information of the VLR-Ds 112 and 114 respectively assigned to the target SUs 160 and 162, the VLR-D device 110 sends respective messages to VLR-Ds 112 and 114 by way of the inter-area network 106 requesting the current routing information pertaining to the target SUs 160 and 162, respectively, such as the DSCs and DLAs of the target SUs 160 and 162 (block 312). The VLR-D devices 112 and 114 respectively perform database searches and then sends the current routing information pertaining to the target SUs 160 and 162 to the VLR-D device 110 (block 313).

Once the VLR-D device 110 has the routing information pertaining to the target SUs 150, 160 and 162, the VLR-D device 110 sends paging messages to the target SUs 150, 160 and 162, respectively (block 314). In the case of target SU 152, the VLR-D device 110 sends the paging message to SU 152 by way of the inter-area network 106, the DSC 120, the intra-area network 130, and the ACG/EBTS 144. In the case of target SUs 160 and 162, the VLR-D 110 device sends paging messages to SUs 160 and 162 by way of inter-area network 106, the DSCs 126 and 128, the intra-area network 132, and the ACG/EBTS 146 and 148, respectively.

Subsequent to the transmission of the paging messages, the VLR-D device 110 waits a predetermined time interval to determine whether any responses to the paging message have been received (block 316). If no response to the paging messages is received, the VLR-D device 110 sends a message to the calling SU 150 by way of the inter-area network 106, the DSC 120, the intra-area network 130, and the ACG/EBTS 142 indicating that the target SUs are not available (block 318). If such is the case, the group call processing ends.

On the other hand, if the VLR-D device 110 receives any response to the paging messages indicating that at least one of the target SUs is available, the VLR-D device 110 allocates channel resources so that the calling and target SUs can perform dispatch communications with each other (block 320). This may entail the VLR-D device 110 assigning respective packet duplicators for the calling and target SUs, assigning a global call identifier to identify the group call, and assigning an appropriate addresses and data link call identifiers to identify path(s) through the inter-area network 106 and intraurban networks 130 and 132. If the dispatch call is only between SU 150 and SU 152 (because SUs 160 and 162 are not available), the VLR-D device 110 instructs the DSC 120 to assign the Global Call Identifier and utilize the appropriate DLCI for the dispatch call through the intra-area network 130.

During the group dispatch call between the calling and target SUs, the VLR-D device 110 controls the communications between both parties (block 322). Since a dispatch call is half-duplex, the VLR-D device 110 limits the channel to a single party after receiving a beginning of transmission (BOT) signal from a "talking" SU. Then, opens the channel after receiving an end of transmission (EOT) signal from the "talking" SU, thereby allowing the other SU to begin transmission.

During a group dispatch call, the VLR-D device 110 clears the call if there is no activity on the channel after a predetermined time interval has expired (block 324). To this endeavor, the VLR-D device 110 resets a timer each time it receives an EOT signal. If the VLR-D device 110 receives a BOT signal prior to the expiration of the predetermined time interval, the VLR-D device 110 does not clear the call. However, if the predetermined time interval expires, the VLR-D device 110 clears the call, and sends messages to that effect to the corresponding packet duplicators and DSCs. After the call clears, the VLR-D 110 creates and stores in its database a detailed record of the call for billing and/or other purposes (block 326). Once this occurs, the call processing ends.

Figure 4:
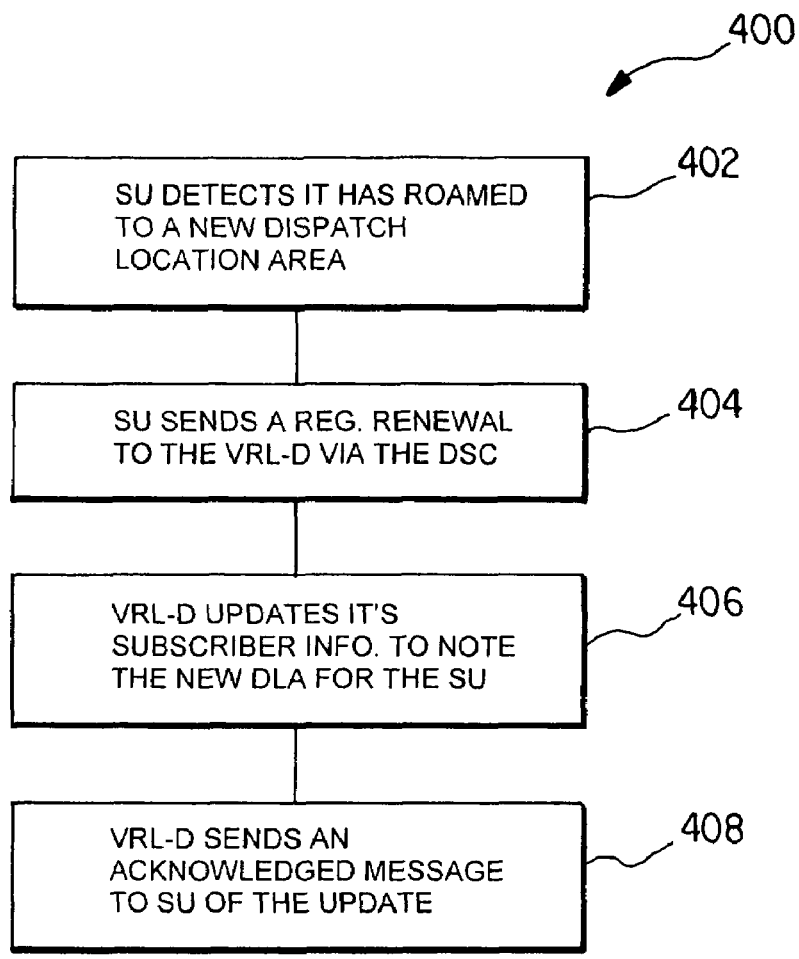
FIG. 4 illustrates a flow diagram of an exemplary method of tracking a roaming SU performed by the exemplary dispatch communications system in accordance with another embodiment of the invention.

FIG. 4 illustrates a flow diagram of an exemplary method 400 of tracking a roaming SU by the exemplary dispatch communications system 100 in accordance with another embodiment of the invention. In this example, the tracking of SU 162 is illustrated. With further reference to FIG. 1, according to the tracking method 400, the SU 162 detects that it has roamed to a location covered by a different predefined group of cell cites also known as a dispatch location area (DLA) (block 402). The SU 162 makes this determination by monitoring the strengths of the signals received from proximate cells cites and utilizes procedures for selecting to a neighbor cell to maintain good coverage.

Once the SU 162 has detected it has roamed to a different DLA, it sends a registration renewal request message to its assigned VLR-D device (e.g., VLR-D device 112) by way of the corresponding ACG/EBTS, the intra-area network 132, the DSC 128, and the inter-area network 106 (block 404). Once the VLR-D device 112 receives the request, it updates its database to denote the new DLA in which the SU 162 resides (block 406). Then, the VLR-D device 112 sends an acknowledge message back to the SU 162 by way of the inter-area network 106, DSC 128, intra-area network 132, and corresponding ACG/EBTS (block 408). In such process, the corresponding DSC 128 may also note the change in the DLA of SU 162.

Figure 5A:
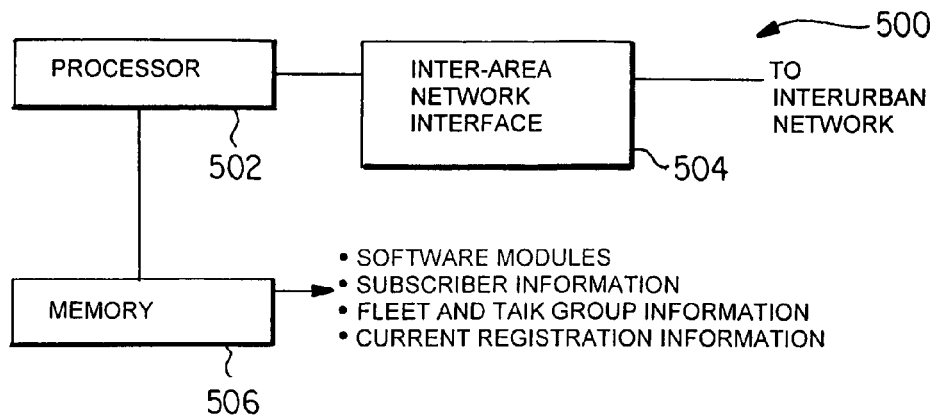
FIG. 5A illustrates a block diagram of an exemplary home location registration dispatch (HLR-D) device in accordance with another embodiment of the invention.

FIG. 5A illustrates a block diagram of an exemplary HLR-D device 500 in accordance with another embodiment of the invention. The HLR-D 500 is an exemplary detailed version of at least one of the HLR-Ds 102 and 104 shown in FIG. 1. The HLR-D 500 comprises a processor 502, an inter-area network interface 504, and a memory 506. The processor 502 performs the various operations of the HLR-D, such as providing information to requesting elements such as during a group call processing event, and assisting in the SU registration process. The inter-area network interface 504 provides an interface to an inter-area network for communicating with other elements of a dispatch communications system. The memory 506, serving generally as a computer-readable medium, stores one or more software modules for controlling the operations of the processor 502, subscriber information, fleet and talk-group information, and current registration information.

Figure 5B:
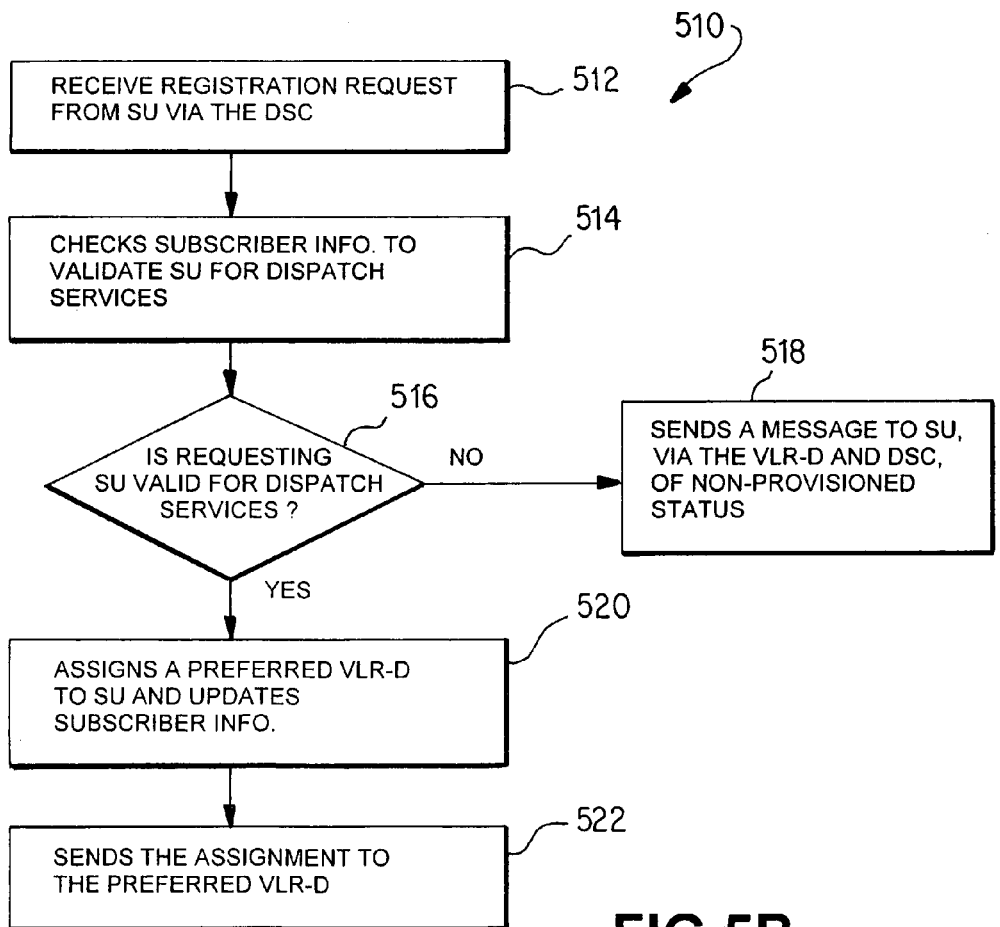
FIG. 5B illustrates a flow diagram of an exemplary method of registering an SU performed by the HLR-D device in accordance with another embodiment of the invention.

FIG. 5B illustrates a flow diagram of an exemplary method 510 of registering an SU by the HLR-D device 500 in accordance with another embodiment of the invention. According to the method 510, the processor 502 receives a registration request from an SU by way of the inter-area network interface 504 (block 512). The processor 502 then searches the subscriber information stored in memory 506 (block 514) to determine whether the requesting SU is provisioned for receiving dispatch services (block 516).

If the processor 502 determines that the requesting SU is not provisioned for receiving dispatch services, the processor 502 sends a message to the SU by way of the inter-area network interface 504 indicating that the SU is not valid for receiving dispatch services (block 518). Otherwise, the processor 502 assigns a preferred VLR-D for the requesting SU based on the fleet and/or talk-group in which the SU belongs (block 520). Then, the processor 502 sends a message to the preferred VLR-D by way of the inter-area network interface 504 indicating an assignment of the requesting SU to the preferred VLR-D (block 522).

Figure 5C:
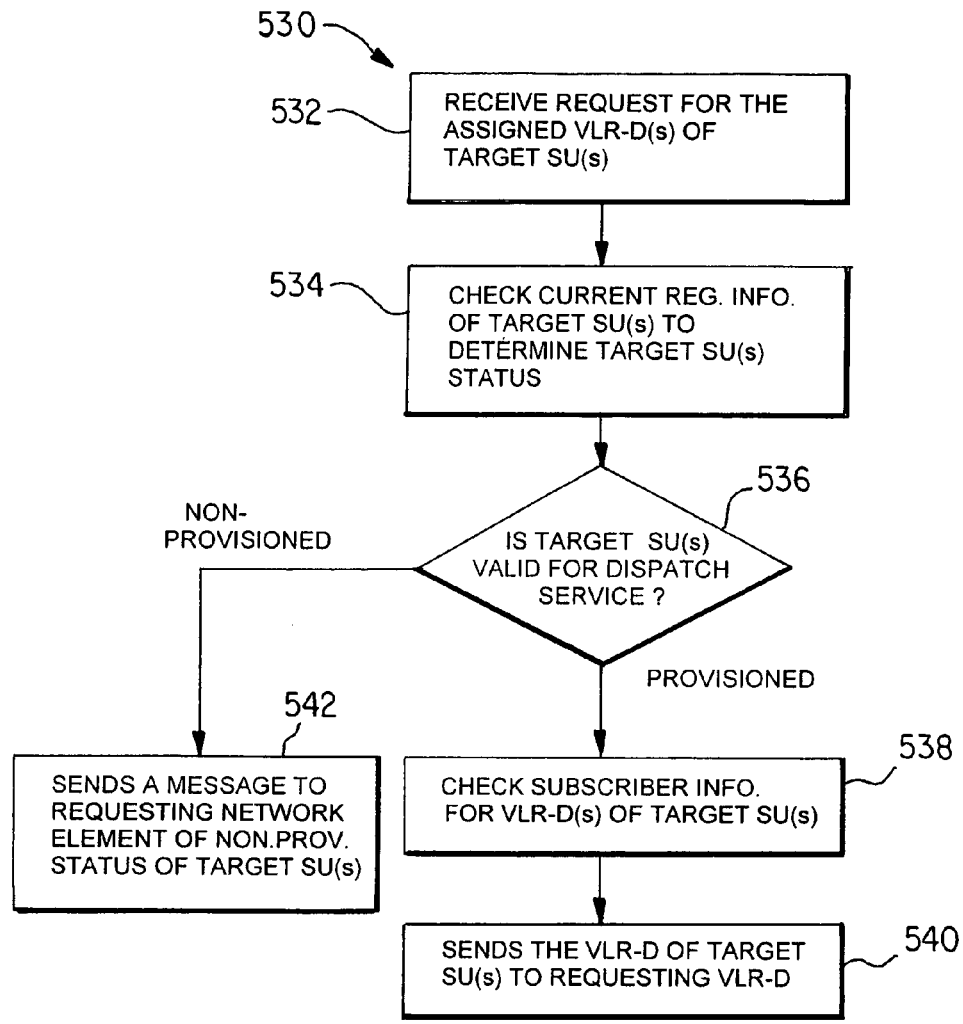
FIG. 5C illustrates a flow diagram of an exemplary method of assisting in the processing of a group dispatch call performed by the HLR-D device in accordance with another embodiment of the invention.

FIG. 5C illustrates a flow diagram of an exemplary method 530 of assisting in the processing of a group dispatch call by the HLR-D device 500 in accordance with another embodiment of the invention. According to the method 530, the processor 502 receives a request for the identity of one or more VLR-Ds devices assigned to the target SU(s) by way of the inter-area network interface 504 (block 532). The processor 502 then searches its database stored in memory 506 (block 534) to determine whether the target SU(s) are provisioned to receive dispatch services (block 536).

If the processor 502 determines that at least one of the target SU(s) are not provisioned, it sends a message to the requesting network element by way of the inter-area network interface 504 indicating that such target SU(s) are not provisioned to receive dispatch services (block 542). For those SU(s) that are provisioned, the processor 502 searches the subscriber information stored in memory 506 to determine the VLR-D device(s) assigned to the target SU(s) (block 538). Then the processor 502 sends information of the VLR-D device(s) assigned to the target SU(s) to the requesting network element by way of the inter-area network interface 504 (block 540).

Figure 6A:
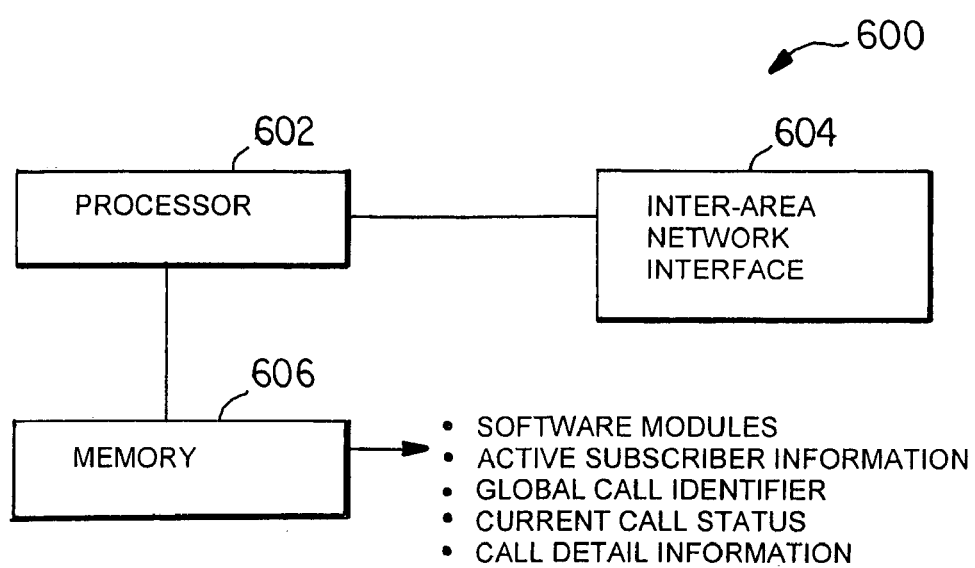
FIG. 6A illustrates a block diagram of an exemplary visitor location registration dispatch (VLR-D) device in accordance with another embodiment of the invention.

FIG. 6A illustrates a block diagram of an exemplary VLR-D device 600 in accordance with another embodiment of the invention. The VLR-D 600 is an exemplary detailed version of at least one of the VLR-D devices 108, 110, 112, and 114 shown in FIG. 1. The VLR-D 600 includes a processor 602, an inter-area network interface 604, and a memory 606. The processor 602 performs the various operations of the VLR-D device 600, such as group dispatch call processing, assisting in group dispatch call processing, and tracking movement of SUs between different DLAs. The inter-area network interface 604 provides an interface to an inter-area network for communicating with other elements of a dispatch communications system. The memory 606, serving generally as a computer-readable medium, stores one or more software modules for controlling the operations of the processor 602, active subscriber information, global call identifiers, current call status, and call detail information.

Figure 6B:
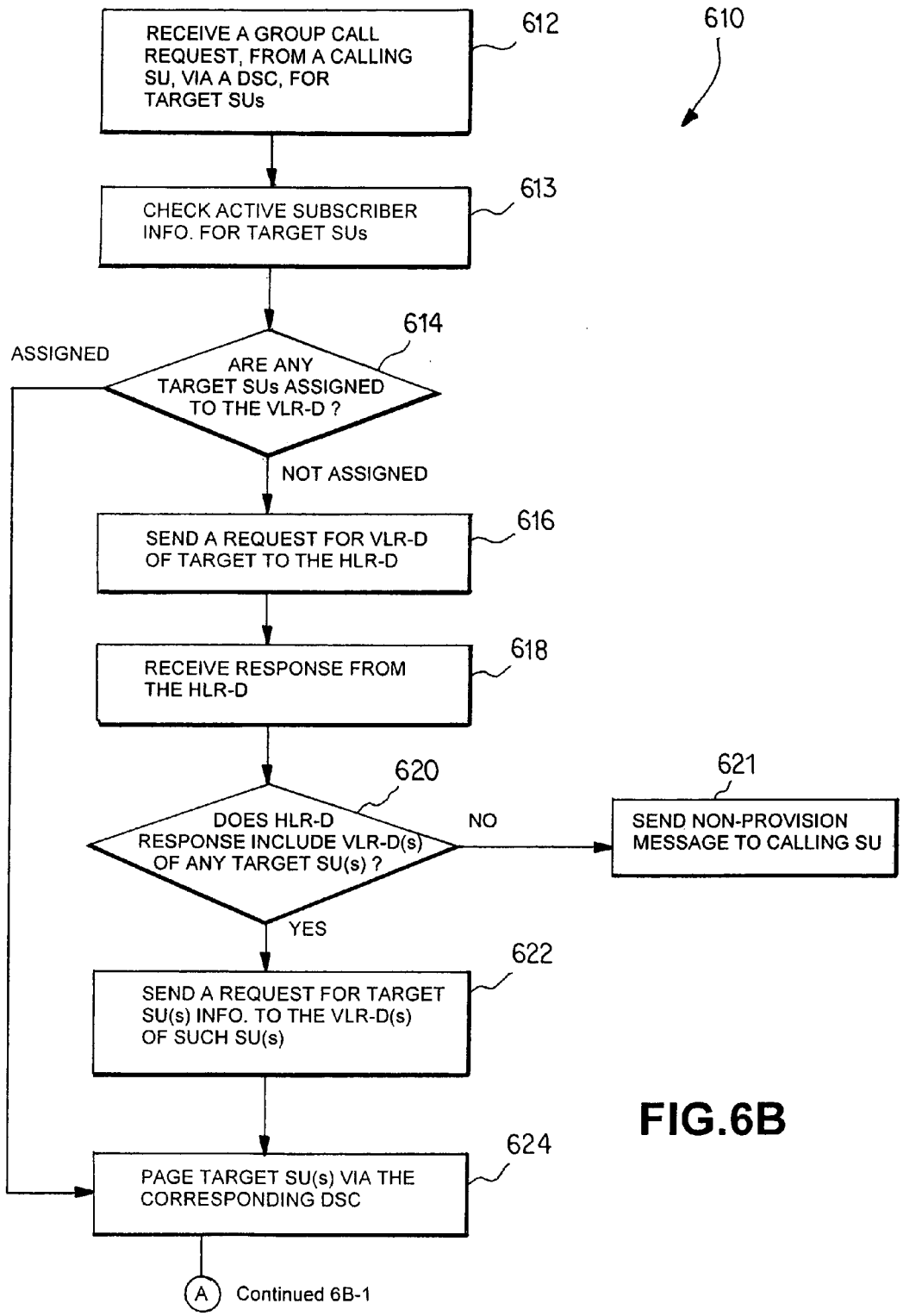
FIG. 6B illustrates a flow diagram of an exemplary method of processing of a group dispatch call performed by the VLR-D device in accordance with another embodiment of the invention.
Figures 1, 6B:
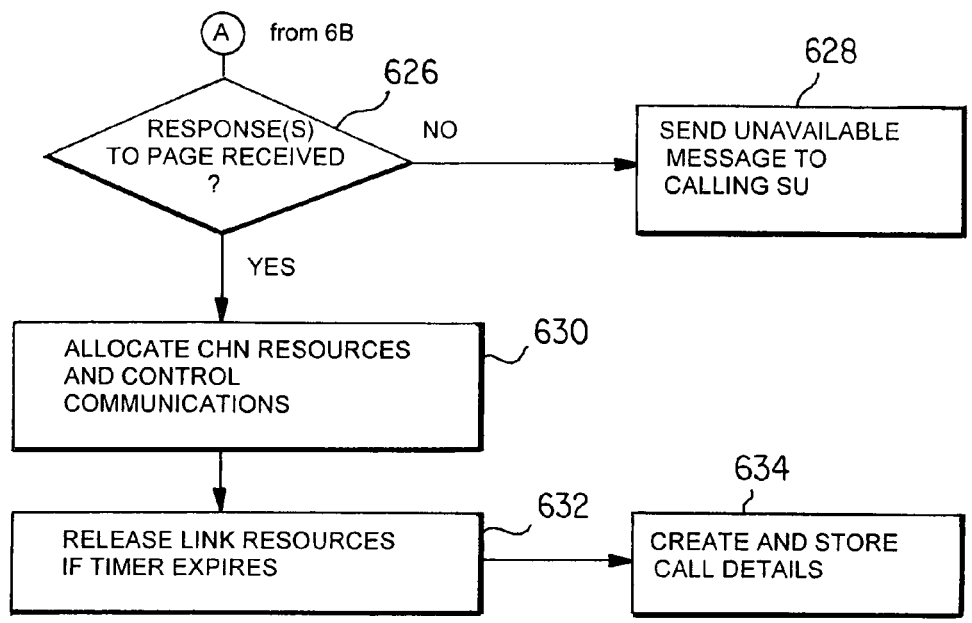

FIG. 6B illustrates a flow diagram of an exemplary method 610 of processing a group dispatch call by the VLR-D device 600 in accordance with another embodiment of the invention. According to the call processing method 610, the processor 602 receives a group call request from a calling SU by way of the inter-area network interface 604 (block 612). The group call request includes information on the target talk-group including two or more target SUs. Then, the processor 602 searches the subscriber information stored in the memory 606 (block 613) to determine whether any of the target SUs are assigned to the instant VLR-D 600 (block 614).

If the processor 602 determines that at least one of the target SUs are assigned to the instant VLR-D 600, the call processing method 600 proceeds to block 624 for those target SU(s) assigned to VLR-D 600. For those target SU(s) not assigned to VLR-D 600, the processor 602 sends a message to an HLR-D device by way of the inter-area network interface 604 requesting information regarding the VLR-D device(s) assigned to the target SU(s) (block 616). Following the request, the processor 602 receives a response from the HLR-D device by way of the inter-area network interface 604 (block 618). The processor 602 then analyzes the response (block 620). If the response received from the HLR-D device indicates that at least one of the target SU(s) is not provisioned to receive dispatch services, the processor 602 sends a message indicating the same to the calling SU by way of the inter-area network interface 604 (block 621).

Otherwise, if the response received from the HLR-D device provides information regarding the VLR-D device(s) assigned to the target SU, the processor 602 sends a request to such VLR-D device(s) by way of the inter-area network interface 604 for the target SU(s) routing information, such as the DSC and DLA of the target SU(s) (block 622). After receiving such information from the target VLR-D devices, the processor 602 sends paging message(s) directed at the DSC and DIA of the target SU(s) by way of the inter-area network interface 604 (block 624). The processor 602 then determines whether it has received any responses to the paging message(s) (block 626). If the processor 602 does not receive any response to the page(s) within a predetermined time interval after sending the page, the processor 602 sends a message to the calling SU by way of the inter-area network interface 604 indicating that the target SU(s) are unavailable (block 628).

Otherwise, the processor 602 allocates channel resources and controls the dispatch communications between the calling and target SUs (block 630). With regard to setting up the group dispatch call, the processor 602 generates a global call identifier to identify the group dispatch call, assigns packet duplicators to generate the voice packets for the calling and target SUs, and identifies appropriate link or address information if the group dispatch call traverses the inter-area communications network 106. With regard to controlling the dispatch communications, the processor 602 monitors the BOT signals from SUs to limit the channel exclusively to a single SU and monitors the EOT signals from SUs to open the channel. The processor 602 clears the call if a predetermined time interval has lapsed since the last EOT signal (block 632). Then, the processor 602 creates a call detail record and stores it in memory 606 (block 634).

Figures 6C, 6D:
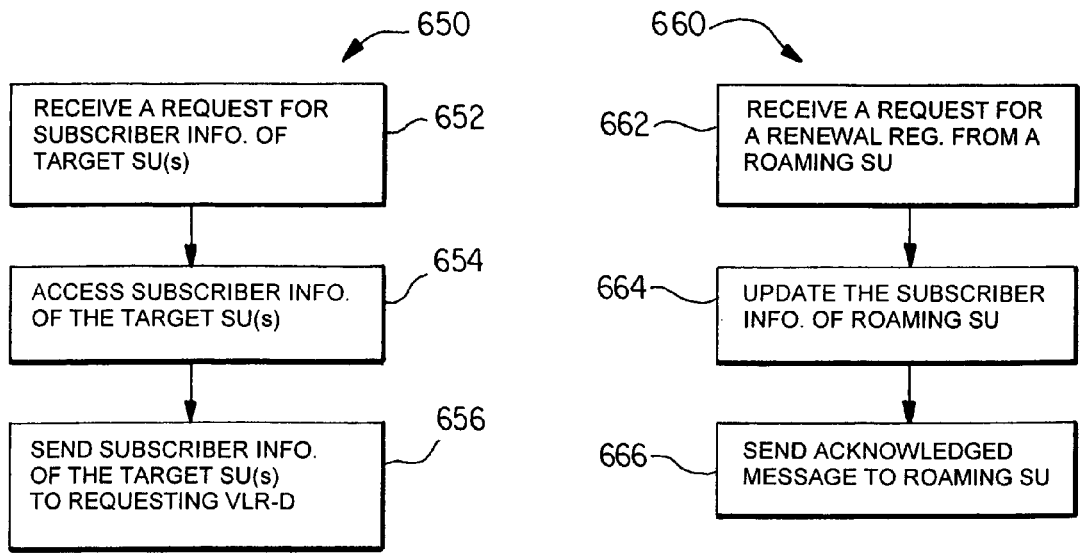
FIG. 6C illustrates a flow diagram of an exemplary method of assisting in the processing of a group dispatch call performed by the VLR-D device in accordance with another embodiment of the invention.
FIG. 6D illustrates a flow diagram of an exemplary method of tracking a roaming SU performed by the VLR-D device in accordance with another embodiment of the invention.

FIG. 6C illustrates a flow diagram of an exemplary method 650 of assisting in the processing of a dispatch call by the VLR-D device 600 in accordance with another embodiment of the invention. This is the case where the VLR-D device 600 is assigned to at least one of the target SUs, and is assisting the VLR-D of the calling SU with the processing of the dispatch call. According to the method 650, the processor 602 receives a request message for routing information pertaining to at least one target SU(s) by way of the inter-area network interface 604 (block 652). Once receiving the request, the processor 602 searches the subscriber information stored in the memory 654 to obtain the routing information (e.g. the DSC and DLA) pertaining to the target SU(s) (block 654). Then, the processor 602 sends this information to the requesting VLR-D device by way of the inter-area network interface 604 (block 656).

FIG. 6D illustrates a flow diagram of an exemplary method 660 of tracking a roaming SU by the VLR-D device 600 in accordance with another embodiment of the invention. This example illustrates the tracking of an SU when it roams between different DLAs. According to the method 660, the processor 602 receives a request for a renewal registration from a roaming SU by way of the inter-area network interface 604 (block 662). In response to the request, the processor 602 updates the subscriber information stored in the memory 606 to reflect that the SU has roamed to a new DLA (block 664). Then, the processor 602 sends a message to the SU by way of the inter-area network interface 604 acknowledging the updated status of the current DLA of the SU (block 666).

Figure 6E:
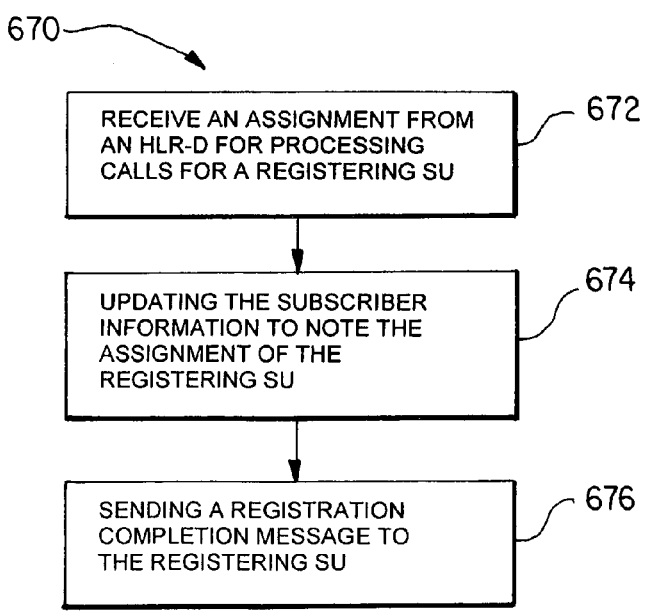
FIG. 6E illustrates a flow diagram of an exemplary method of assisting in the registration of an SU performed by the VLR-D device in accordance with another embodiment of the invention.

FIG. 6E illustrates a flow diagram of an exemplary method 670 of assisting in the registration of an SU performed by the VLR-D 600 in accordance with another embodiment of the invention. This example illustrates the process of the VLR-D device obtaining an assignment of a registering SU from an HLR-D. According to the method 670, the processor 602 receives a message from an HLR-D device by way of the inter-area network interface 604 assigning the VLR-D device 600 to handle dispatch calls for a registering SU (block 672). The assignment may include routing information pertaining to the SU, such as its DSC and DLA. Then the processor 602 updates the subscriber information stored in memory 606 to include the routing information pertaining to the SU (block 674). Once the updating is complete, the processor 602 sends a message to the registering SU by way of the inter-area network interface 604 indicating that the registration process is complete (block 676).

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A dispatch communications system, comprising:
    a first intra-area dispatch communications network to facilitate group dispatch calling between subscriber units residing within a first geographical area;
    a second intra-area dispatch communications network to facilitate group dispatch calling between subscriber units residing within a second geographical area different than said first geographical area;
    an inter-area dispatch communications network to facilitate group dispatch calling between subscriber units residing respectively in said first and second geographical areas; and
    a first interface device for interfacing said first intra-area dispatch communications network to said inter-area dispatch communications network by converting communications between a protocol of the first intra-area dispatch communications network and the inter-area dispatch communications network.

2. The dispatch communications system of claim 1, further comprising a first call processing unit for establishing a dispatch communications link across said inter-area dispatch communications network.

3. The dispatch communications system of claim 2, wherein said first call processing unit is configured to:
    receive a group dispatch call request from a calling subscriber unit residing in said first geographical area, wherein the dispatch call request identifies at least one target subscriber unit residing in said second geographical area; and
    establish said dispatch communications link across said inter-area communications link to allow said calling subscriber unit to communicate with said at least one target subscriber unit.

4. The dispatch communications system of 3, further comprising a home location registration dispatch (HLR-D) device containing information related to call processing units assigned to process dispatch calls for subscriber units.

5. The dispatch communications system of claim 4, wherein said first call processing unit is configured to:
    request and receive information from said HLR-D device related to a second call processing unit assigned to handle dispatch calls for said at least one target subscriber unit;
    request and receive information from said second call processing unit related to routing information pertaining to said at least one target subscriber unit; and
    send at least one paging message in accordance with said routing information.

6. The dispatch communications system of claim 5, wherein said first call processing unit is configured to establish said dispatch communications link after receiving a response to said at least one paging message from said at least one target subscriber unit.

7. The dispatch communications system of claim 5, wherein said first call processing unit is configured to send a message to said calling subscriber unit indicating that said at least one target subscriber unit is unavailable if no response to said paging message is received from said at least one target subscriber unit.

8. The dispatch communications system of claim 1, further comprising first and second packet duplicators for generating voice packets respectively for said calling subscriber unit and said at least one target subscriber unit, wherein said voice packets are compliant for transmission across said inter-area communications network.

9. The dispatch communications system of claim 1, further comprising a second interface device for interfacing said second intra-area communications network to said inter-area communications network, wherein the first interface device maps addresses of devices of the first intra-area communications network.

10. The dispatch communications system of claim 1, further comprising a first set of cell sites coupled to said first intra-area communications network, and a second set of cell sites coupled to said second intra-area communications network.

11. The dispatch communications system of claim 1, further comprising a first packet duplicator for generating voice packets to be transmitted across said first intra-area communications network, and a second packet duplicator for generating voice packets to be transmitted across said second intra-area communications network.

12. The dispatch communications system of claim 1, wherein at least one of said subscriber units comprises a mobile station.

13. A method of processing a dispatch call, comprising:
    receiving a group dispatch call request from a calling subscriber unit by way of a first intra-area dispatch communications network configured to facilitate group dispatch calling between subscriber units residing within a first geographical area, wherein the group dispatch call request identifies a talk-group including at least one target subscriber unit residing in a second geographical area distinct from said first geographical area, and wherein a second intra-area dispatch communications network is configured to facilitate group dispatch calling between subscriber units within said second geographical area;
    establishing a dispatch communications link between said first and second intra-area dispatch communications networks via an inter-area communications network to allow said calling subscriber unit to communicate with said at least one target subscriber unit, if said at least one target subscriber unit is available; and
    converting communications between a protocol of the first intra-area dispatch communications network and the inter-area communications network.

14. The method of claim 13, further comprising requesting and receiving information from a home location registration dispatch (HLR-D) device related to a call processing unit assigned to handle dispatch calling for said at least one target subscriber unit.

15. The method of claim 14, further comprising requesting routing information pertaining to said at least one target subscriber unit from said call processing unit.

16. The method of claim 15, further comprising sending at least one paging message in accordance with said routing information pertaining to said at least one target subscriber unit.

17. The method of claim 16, wherein establishing said dispatch communications link comprises establishing said dispatch communications link if a response to said at least one paging message is received from said at least one target subscriber unit.

18. The method of claim 16, further comprising sending a message to said calling subscriber unit indicating that said at least one target subscriber unit is unavailable if no response to said paging message is received.

19. The method of claim 13, wherein establishing said dispatch communications link comprises assigning first and second packet duplicators to generate voice packets respectively for said calling subscriber unit and said at least one target subscriber unit, wherein said voice packets are compliant for transmission across said inter-area communications network.

20. The method of claim 13, wherein said calling subscriber unit and/or said at least one target subscriber unit comprises a mobile station.

21. A call processing unit, comprising:
a network interface to interface with an inter-area dispatch communications network; and
a processor configured to:
receive a group dispatch call request from a calling subscriber unit by way of said network interface, wherein said dispatch call request identifies a talk-group including a plurality of target subscriber units;
send respective paging messages for said target subscriber units;
establish a dispatch communications link between said calling and at least one of said target subscriber units across said inter-area dispatch communications network if a response to said paging message is received by way of said network interface;
generate a data link call identifier for identifying said dispatch communications link across said inter-area dispatch communications network.

22. The call processing unit of claim 21, wherein said processor is configured to:
send a message to another call processing unit by way of said network interface requesting routing information pertaining to at least one of said target subscriber units; and
receive said routing information pertaining to at least one of said target subscriber unit by way of said network interface.

23. The call processing unit of claim 22, wherein said processor is configured to:
send a message to a home location registration dispatch (HLR-D) device by way of said network interface requesting information related to said another call processing unit; and
receive said information related to said another call processing unit by way of said network interface.

24. The call processing unit of claim 21, wherein said processor is configured to receive an assignment to handle dispatch calls for a subscriber unit by way of said network interface.

25. The call processing unit of claim 21, further comprising a memory, and wherein said processor is configured to:
receive an assignment to handle dispatch calls for a subscriber unit by way of said network interface;
store information related to said assignment in said memory; and
send a message to said subscriber unit by way of said network interface indicating that the subscriber unit is registered to receive dispatch calling services.

26. The call processing unit of claim 21, further comprising a memory, and wherein said processor is configured to:
receive routing information pertaining to a subscriber unit by way of said network interface; and
store said routing information in said memory.

27. The call processing unit of claim 21, further comprising a memory to store a current dispatch location area of a subscriber unit, and wherein said processor is configured to:
receive a message from said subscriber unit indicating that said subscriber unit is changing from said current dispatch location area to a new dispatch location area; and
update said information related to said current dispatch location area of said subscriber unit to note said new dispatch location area of said subscriber unit.

28. The call processing unit of claim 21, further comprising a memory containing routing information pertaining to another subscriber unit, wherein said processor is configured to:
receive a request from a requesting element for said routing information pertaining to said another subscriber unit;
access said routing information from said memory; and
send said routing information to said requesting element by way of said network interface.

29. The call processing unit of claim 21, wherein said processor is configured to generate an assignment of packet duplicators for generating voice packets respectively for said calling subscriber unit and at least one of said target subscriber units.

30. The call processing unit of claim 21, wherein said processor is configured to generate a global call identifier to identify said group dispatch call between said calling and at least one of said target subscriber units.

31. The call processing unit of claim 21, wherein said calling subscriber unit and/or at least one of said target subscriber unit comprises a mobile station.

32. A computer-readable medium comprising one or more software modules to control a processor to:
receive a group dispatch call request from a calling subscriber unit by way of a network interface coupled to an inter-area dispatch communications network, wherein said group dispatch call request identifies a talk-group including a plurality of target subscriber units;
send respective paging messages in accordance with routing information pertaining to said target subscriber units;
establish a communications link between said calling subscriber unit and at least one of said target subscriber units across said inter-area dispatch communications network if a response to said paging message is received by way of said network; and
generate a data link call identifier for identifying said dispatch communications link across said inter-area dispatch communications network.

33. The computer-readable medium of claim 32, wherein said one or more software modules control said processor to:
send a message to a call processing unit by way of said network interface requesting routing information pertaining to at least one of said target subscriber units; and
receive said routing information by way of said network interface.

34. The computer-readable medium of claim 32, wherein said one or more software modules control said processor to:
send a request to a home location registration dispatch (HLR-D) device by way of said network interface for information related to said call processing unit; and
receive said information related to said call processing unit by way of said network interface.

35. The computer-readable medium of claim 32, wherein said one or more software modules control said processor to receive an assignment to handle dispatch calls for said calling subscriber unit by way of said network interface.

36. The computer-readable medium of claim 32, wherein said one or more software modules control said processor to:
receive an assignment to handle dispatch calls for said calling subscriber unit by way of said network interface;
store information related to said assignment in said memory; and
send a message to said calling subscriber unit by way of said network interface indicating that the calling subscriber unit is registered to receive dispatch calling services.

37. The computer-readable medium of claim 32, wherein said one or more software modules control said processor to:
receive routing information pertaining to said calling subscriber unit by way of said network interface; and
store said routing information in said memory.

38. The computer-readable medium of claim 32, further comprising a memory to store information related a current dispatch location area of a subscriber unit, and wherein said processor is configured to:
receive a message from said subscriber unit indicating that said subscriber unit is changing from said current dispatch location area to a new dispatch location area; and
update said information related to said current dispatch location area of said subscriber unit to note said new dispatch location area of said subscriber unit.

39. The computer-readable medium of claim 32, wherein said one or more software modules control said processor to:
receive a request from a requesting element for routing information pertaining to another subscriber unit;
access said routing information from a memory; and
send said routing information to said requesting element by way of said network interface.

40. The computer-readable medium of claim 32, wherein said one or more software modules control said processor to generate an assignment of packet duplicators for generating voice packets respectively for said calling subscriber unit and at least one of said target subscriber units.

41. The computer-readable medium of claim 32, wherein said one or more software modules control said processor to generate a global call identifier to identify said dispatch call between said calling subscriber unit and at least one of said target subscriber units.

42. The computer-readable medium of claim 32, wherein said calling subscriber unit and/or at least one of said target subscriber units comprises a mobile station.

* * * * *